March 17, 1964 K. C. MOSIER 3,124,817
ROTARY TOOL SPINDLE HAVING RAPID TRAVERSE MOVEMENT
FOLLOWED BY SLOWER FEED RATE
Filed Sept. 22, 1961 4 Sheets-Sheet 1

INVENTOR.
Kenneth C. Mosier,
BY
W. A. Morry
atty.

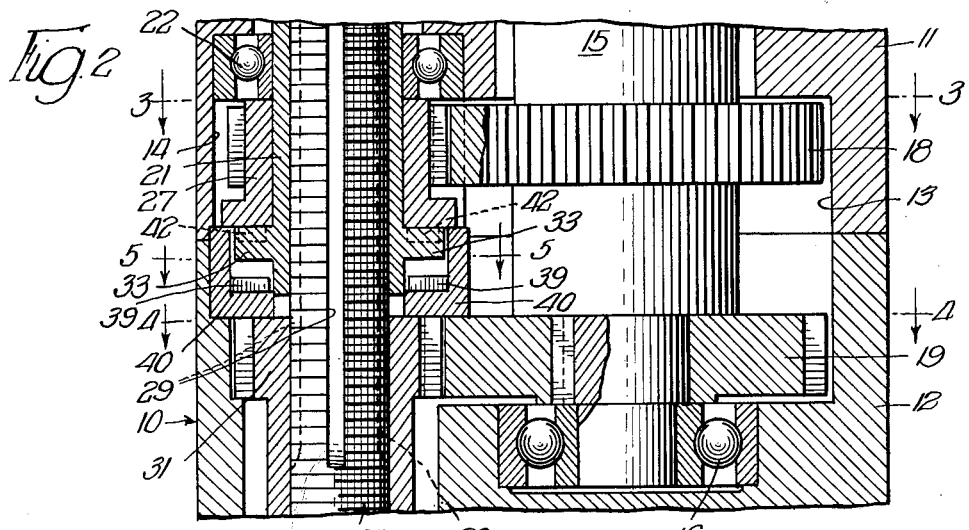

March 17, 1964     K. C. MOSIER     3,124,817
ROTARY TOOL SPINDLE HAVING RAPID TRAVERSE MOVEMENT
FOLLOWED BY SLOWER FEED RATE
Filed Sept. 22, 1961     4 Sheets-Sheet 3
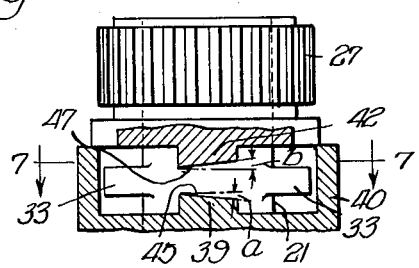
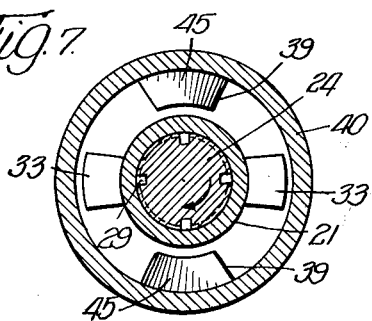
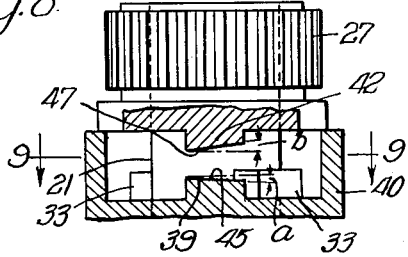
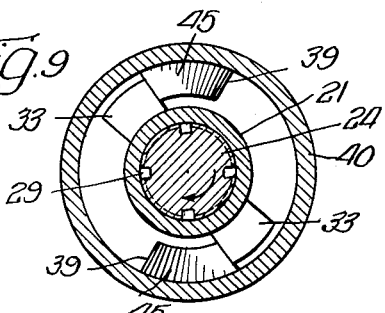
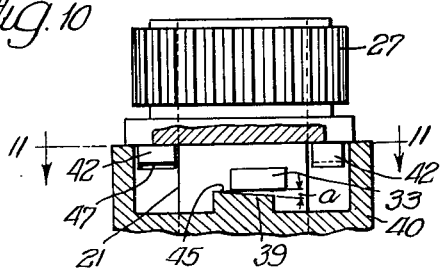
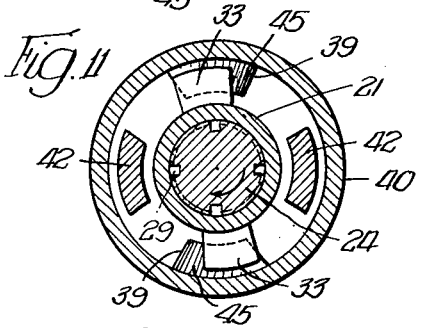
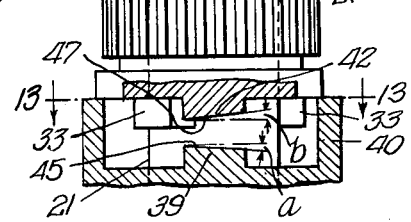
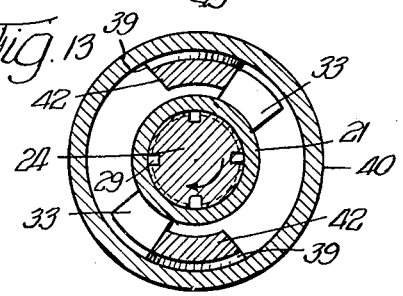
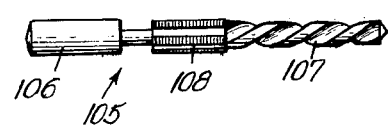
INVENTOR.
Kenneth C. Mosier
BY
W. A. Morry
ATTY United States Patent Office 3,124,817
Patented Mar. 17, 1964

3,124,817
ROTARY TOOL SPINDLE HAVING RAPID TRAVERSE MOVEMENT FOLLOWED BY SLOWER FEED RATE
Kenneth C. Mosier, 1900 W. Dorothy Lane, Dayton 39, Ohio
Filed Sept. 22, 1961, Ser. No. 139,988
14 Claims. (Cl. 10—128)

The present invention relates generally to improvements in hole drilling apparatus, and particularly, to new and improved power drills.

The general object of the present invention is to provide new and improved compact power drills having self-feeding features, which drills may be utilized for simultaneously drilling a plurality of closely grouped holes or for drilling holes in remote, hard-to-reach locations as well as for the more common drilling operations.

An important object of the present invention is to provide a new and improved compact power drill of the character described wherein a drill spindle is provided with a rapid traverse movement toward the work to be drilled until such time that a drill bit mounted in the spindle engages the work whereupon a relative slow feed rate is automatically imparted to the spindle with a rapid traverse return being automatically imparted to the spindle upon withdrawal of the drill bit from the work.

Another important object of the present invention is to provide a new and improved power drill of the character described which is adapted for skip-drilling operations.

A further object of the present invention is to provide improved power drills of the character described which are economical to fabricate and which are substantially more compact, lightweight, and simpler to operate than drills of the type including ponderous slides on which are mounted motors driving gang drills with the slides being operated in and out by feed screws or cylinders.

A still further important object of the present invention is to provide a new and improved combination drill-tap tool having a drill formation at its forward end and a thread-cutting or tap formation spaced therefrom, which tool is adapted for use in power drills of the character described whereby the spindle and tool approach the work with a rapid traverse movement, have a slow feed rate automatically imparted thereto during the drilling operation, have a tap feed rate automatically imparted thereto during the thread-cutting operation, and are withdrawn from the work with a rapid return movement. In order for the apparatus to operate as a lead screw tapper, the lead of the thread on the spindle must be equal to the lead of the tap portion of the combination drill-tap tool.

Certain other objects of the invention will, in part, be obvious, and will in part appear hereinafter.

For a more complete understanding of the nature and scope of the invention reference may now be had to the accompanying drawings wherein:

FIG. 2 is a fragmentary central vertical section similar to FIG. 1 with the clutch means engaged whereby a relatively slow feed movement is imparted to the drill spindle;

FIG. 3 is a reduced-in-scale horizontal section taken generally on the line 3—3 of FIG. 2;

FIG. 4 is a reduced-in-scale horizontal section taken generally on the line 4—4 of FIG. 2;

FIG. 5 is a horizontal section taken generally on the line 5—5 of FIG. 2;

FIG. 6 is an enlarged vertical section taken generally on the line 6—6 of FIG. 1 with the clutch lugs in disengaged transient positions and rotated 90° relative to their positions in FIG. 1;

FIG. 7 is a horizontal section taken generally on the line 7—7 of FIG. 6;

FIG. 8 is a vertical section similar to FIG. 6 with the clutch lugs engaged with the stationary clutch jaws, as during rapid traverse of the drill spindle;

FIG. 9 is a horizontal section taken generally on the line 9—9 of FIG. 8;

FIG. 10 is a vertical section similar to FIGS. 6 and 8 with the clutch lugs disposed in a transient position in engagement with the inclined upper surface of the fixed clutch jaws whereby the clutch lugs are about to be engaged by the clutch jaws on the rotating feed gear;

FIG. 11 is a horizontal section taken generally on the line 11—11 of FIG. 10;

FIG. 12 is a vertical section similar to FIGS. 6, 8 and 10 with the clutch lugs disposed in driving engagement with the clutch jaws on the rotating feed gear;

FIG. 13 is a horizontal section taken generally on the line 13—13 of FIG. 12;

FIG. 14 is a central vertical section taken through another embodiment of the invention adapted for drilling in remote locations;

FIG. 19 is a side elevational view of a combination drill-tap tool adapted for use in the drills illustrated in FIGS. 1, 4 and 15.

Figure 1:
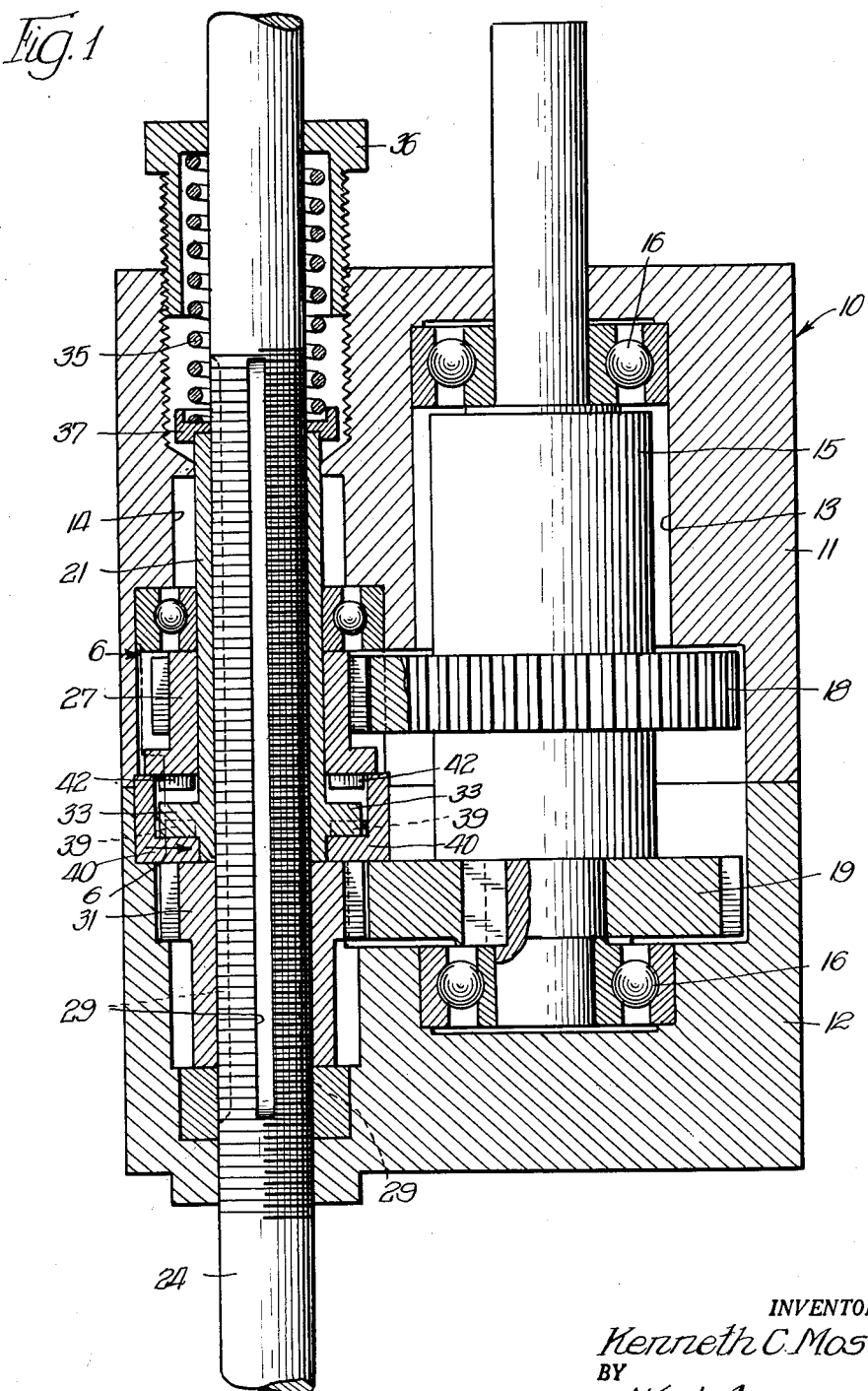
FIG. 1 is a central vertical section taken through one embodiment of the invention with the clutch means disengaged whereby a rapid traverse movement is imparted to the drill spindle.
Figure 15:
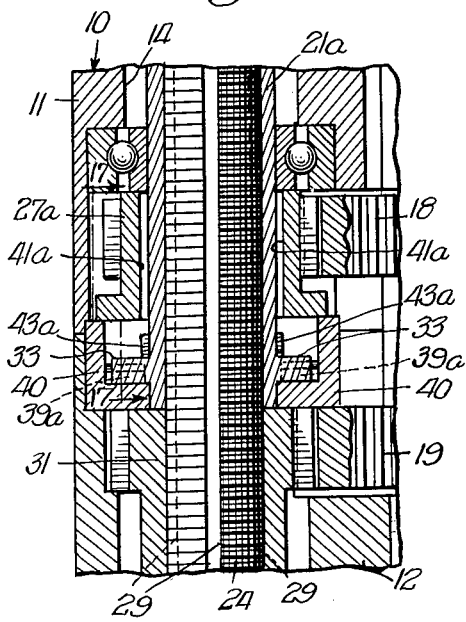
FIG. 15 is a fragmentary central vertical section similar to FIG. 1 of a still further embodiment of the invention with the clutch means disengaged whereby a rapid traverse movement is imparted to the drill spindle.
Figure 16:
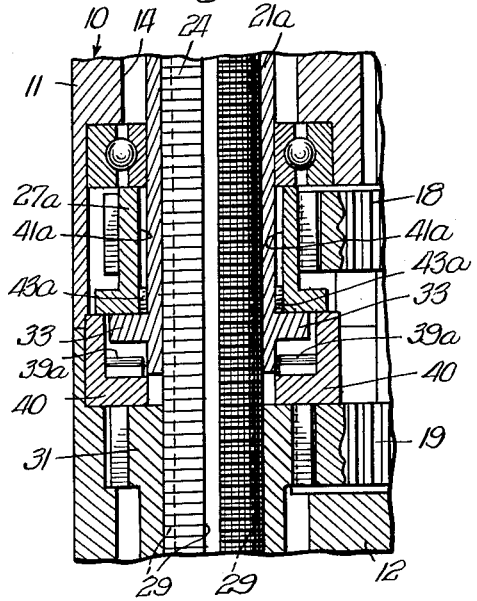
FIG. 16 is a fragmentary central vertical section similar to FIG. 2 of the embodiment of FIG. 15 with the clutch means engaged whereby a relatively slow feed movement is imparted to the drill spindle.
Figure 17:
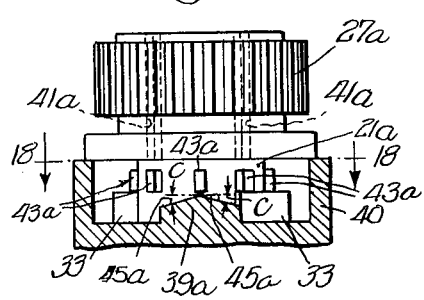
FIG. 17 is a vertical section taken generally on the line 17—17 of FIG. 15.
Figure 18:
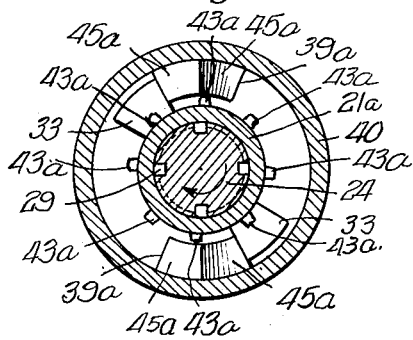
FIG. 18 is a horizontal section taken generally on the line 18—18 of FIG. 17.

The embodiment of the invention illustrated in FIGS. 1–5, includes a housing 10, including upper and lower portions 11 and 12, respectively, which housing is provided with a pair of generally parallel passages 13 and 14 which are disposed in side-by-side relationship with the two passages communicating with each other for a portion of their length. A drive shaft 15 is rotatably mounted in the passage 13 in bearings 16 with the upper end of the shaft 15 projecting outwardly of the housing 10 and adapted to be rotatably driven by suitable rotary power means, such as an electric motor or an air motor, either of which may be mounted directly on the housing 10. A pair of gears 18 and 19 are secured on the drive shaft 15 by suitable means in longitudinally spaced relationship and in the portion of the passage 13 which is in communication with the passage 14. The gear 19 is provided with a different number of teeth than the gear 18 for differential driving purposes, as will be fully explained hereinafter. For example, the gear 18 may be provided with thirty-five teeth and the gear 19 with thirty-six teeth.

A sleeve member 21 is mounted in the passage 14 for rotatable and limited longitudinal movements therein. A drill spindle 24 extends through the sleeve member 21 and is provided with an externally threaded portion which is disposed in threaded engagement with an internal thread formed in the bore of the sleeve member 21. Thus, rotation of the drill spindle 24 while the sleeve member 21 is held stationary will result in longitudinal movement of the drill spindle 24 either inwardly or outwardly of the housing 10 depending upon the direction of rotation of the spindle 24 and whether the threads are right or left hand threads. A feed gear 27 is freely rotatable about the sleeve member 21 and is meshed in driving engagement with the gear 18 on the drive shaft 15 whereby during rotation of the drive shaft 15, the feed gear 27 is rotated by the gear 18.

The drill spindle 24 is provided on its outer surface with four longitudinally extending spline grooves 29 which are spaced 90° apart. A rapid traverse or drive gear 31, which is rotatably mounted in the passage 14 and disposed in meshed driving engagement with the gear 19 on the drive shaft 15, is spline connected to the drill spindle 24 below the sleeve member 21 whereby during rotation of the drive shaft 15, the drill spindle 24 is rotatably driven by the drive gear 31. The spline connection between the drive gear 31 and the drill spindle 24 permits longitudinal movement of the drill spindle 24 relative to the drive gear 31.

The feed gear 27 may be provided with a different number of teeth than the drive gear 31. For example, the drive gear 31 may be provided with eighteen teeth and the feed gear 27 with nineteen teeth. To provide the necessary differential drive relationship for operation of the apparatus disclosed herein, the gear ratios between the gears 19 and 31 and the gears 18 and 27 must be different. For example, when the gear ratio between the gear 19 and the drive gear 31 is slightly higher than the gear ratio between the gear 18 and the feed gear 27, during rotation of the drive shaft 15 and the resulting simultaneous rotation of the feed gear 27 and the drive gear 31, the drive gear 31 will be rotated a small percent of one revolution per revolution faster than the feed gear 27. Therefore, when the feed gear 27 is operably connected to the sleeve member 21, the sleeve member 21 which is threadedly engaged with the drill spindle 24 is rotated at a slightly slower speed than the speed at which the drill spindle 24 is rotated by the drive gear 31. This differential gear drive has the effect of imparting a low rate of longitudinal feed movement to the drill spindle 24. With a variation of one gear tooth between the gears 18 (35 teeth) and 19 (36 teeth) and between the gear 27 (19 teeth) and 31 (18 teeth), for example, feed rates for the drill spindle 24 in the extremely low range of approximately .001 inch per revolution may be provided. When, on the other hand, the sleeve member 21 which is disposed in threaded engagement with the drill spindle 24 is held stationary during rotation of the drill spindle 24 by the drive gear 31, the drill spindle 24 will have a relatively fast or rapid traverse longitudinal movement imparted thereto. Without changing the gear ratios, the rapid traverse and feed rates may be varied by providing a thread with a different pitch between the drill spindle 24 and the sleeve member 21.

Provision is made whereby the drill spindle 24 normally has the rapid traverse movement imparted thereto until such time that a drill bit mounted in the drill spindle 24 comes into engagement with the work to be drilled whereupon the relatively slower feed rate is automatically imparted to the drill spindle 24 during the drill operation. As best illustrated in FIGS. 1, 2 and 5, the lower end of the sleeve member 21 is provided with a pair of diametrically opposite radially extending lugs 33 which may be integrally formed thereon. The sleeve member 21 is normally resiliently urged downwardly into a first position by a coil spring 35 which is disposed about the upper end of the drill spindle 24 and is seated between a cap member 36 which is threadedly mounted in the upper end of the passage 14 and a spring retainer 37 which is mounted on the upper end of the sleeve member 21. In this first lowermost position of the sleeve member 21, the lugs 33 are aligned for edgewise engagement with a pair of diametrically opposite stationary jaw members 39 formed on a rigid portion 40 of the housing 10, as best illustrated in FIGS. 1, 8 and 9. The sleeve member 21, when it is in its first lowermost position with the lugs 33 engaged against the jaw members 39, is held stationary during rotation of the drill spindle 24 by the drive gear 31 whereby the rapid traverse longitudinal movement is imparted to the drill spindle 24. With the sleeve member 21 held stationary, the feed gear 27 driven by the gear 18 merely rotates freely about the sleeve member 21.

When a drill bit mounted in the drill spindle 24 engages the work to be drilled, during rapid traverse movement thereof, the pressure exerted by the work against the drill bit overcomes the force of the coil spring 35 and shifts the sleeve member 21 through its threaded engagement with the drill spindle 24 upwardly into its second raised position. In this second uppermost position of the sleeve member 21, the lugs 33 are aligned for edgewise engagement by a pair of diametrically opposite jaw members 42 formed on the lower end of the feed gear 27 whereby to drivingly connect the sleeve member 21 to the feed gear 27, as illustrated in FIGS. 2, 12 and 13. Thus, the sleeve member 21 which is threadedly engaged with the drill spindle 24 will be rotated by the feed gear 27 at a speed slightly slower than the speed at which the drill spindle 24 is rotated by the drive gear 31 whereby to impart the relatively slow longitudinal feed movement to the drill spindle 24 during the drilling operation.

The lugs 33 on the sleeve 21 and the jaw members 39 and 42 constitute a dog-type clutch device which is automatically operable or engageable upon pressure being applied to the point of the drill bit mounted in the drill spindle 24 whereby to automatically change the longitudinal movement of the drill spindle 24 from the rapid transverse movement to the relatively slow feed movement. By varying the effective force of the coil spring 35 through adjustment of the cap member 36, the amount of point pressure required to cause the drill spindle 24 to go in and out of feed may be readily pre-set.

When the direction of rotation of the drive shaft 15 is reversed to withdraw the drill bit from the work, the point pressure on the drill bit is removed whereby to permit the sleeve member 21 to be shifted by the coil spring 35 into its first lowermost position to disengage the lugs 33 from the clutch jaws 42 on the feed gear 27 and engage them with the stationary clutch jaws 39 whereby the drill spindle and the attached drill bit will be withdrawn from the work with a rapid return movement inasmuch as the sleeve member 21 threadedly engaged with the drill spindle 24 is held stationary during reverse rotation of the spindle 24 by the drive gear 31.

The structure and operation of the clutch device may best be described with reference to FIGS. 6–13. The upper faces 45 of the stationary clutch jaws 39 are disposed at a slight angle $a$ to the horizontal and the lower faces 47 of the clutch jaws 42 on the feed gear 27 are disposed at a slight angle $b$ to the horizontal. The vertical dimensions of the clutch jaws 39 and 42 are chosen so that the clearance between the "high points" on the faces 45 of the jaws 39 and on the faces 47 of the jaws 42 is less than the vertical dimension or thickness of the lugs 33 on the sleeve member 21. Thus, during vertical transient movement of the sleeve member 21 between its uppermost and lowermost positions, the lugs 33 can never be positioned so that they are neither in register with the stationary jaws 39 nor the jaws 42 on the feed gear 21. A transit position of the sleeve member 21 as it moves upwardly from its lowermost position toward its uppermost position is illustrated in FIGS. 10 and 11. In this position of the sleeve member 21 it is noted that the lugs 33 thereon have risen above the side edges of the stationary jaw members 39 and are held against rotation by their engagement with the angular upper faces 45 thereof. As the lugs 33 continue to rise or "ride up" the angular faces 45 of the stationary jaws 39, they will be positioned in register for rotatable driving engagement by the jaws 42 on the feed gear 27, thus imparting the relatively slow feed rate to the drill spindle 24. The angle $b$ should be slightly greater than the pitch of the thread of the spindle 24 so that if the leading "high point" edges of the jaw members 42 on the feed gear 27 pass over the lugs 33, no trailing portions of the jaw members 42 will contact the lugs 33. Thus the lugs 33 can only be drivingly engaged by the leading edges of the jaw members 42 on the feed gear 27. The angle $a$ may be in the order of 4° and the angle $b$ may be in the order of 5°, for example.

Although the novel dog-type clutch described herein is preferred, it is noted that friction clutches of well-known types could be used in modifications of the hole-drilling apparatus disclosed herein.

The hole-drilling apparatus disclosed herein can readily be adapted for multiple or gang drilling operations. For instance, a number of spindle assemblies similar to the one illustrated and described could be mounted in a circular arrangement with the feed and drive gears thereof all being differentially driven by the gears 18 and 19. For multiple or gang drilling of a series of closely grouped holes, the feed and drive gears of a plurality of spindle assemblies arranged in a circle could be differentially driven by a pair of ring gears. In such multiple or gang drilling modifications, each of the drill spindles could be provided with different rapid traverse and feed rates by providing different thread pitches on the drill spindles. Further, as each spindle assembly of such modifications would include its own clutch device, each drill spindle could go in and out of feed independently of the others.

The embodiment of the invention illustrated in FIG. 14 is adapted for drilling holes in remote or hard-to-reach locations inasmuch as the power input may be spaced a considerable distance from the drill spindle. This embodiment includes an elongated housing 70 having a series of generally parallel passages 71, 72, 73 and 74 formed therein in side-by-side relationship with portions of each passage being in communication with the passages on either side thereof. The power input is provided by a drive shaft 76 which is rotatably mounted in one of the end passages 71 in bearings 77. The drive shaft 76 which may be rotatably driven by any suitable rotary power means, such as an electric motor or an air motor, has a gear 79 secured thereon. The gear 79 is meshed in driving engagement with a gear 80 which is secured on a stub shaft 81 rotatably mounted in the passage 72 in bearings 82. The gear 80 is meshed in driving engagement with a gear 84 which is secured on a stub shaft 85 rotatably mounted in the passage 73 in bearings 86. Another gear 87 is also secured on the stub shaft 85 in longitudinally spaced relationship to the gear 84, which gear 84 has a different number of teeth than the gear 87. With the gear train described herein, rotation of the drive shaft 76 will result in simultaneous rotation of the two gears 84 and 87 in the same direction. The housing 70, of course, may be much longer than that shown in FIG. 14 and additional gears may be utilized to provide a suitable gear train between the drive shaft 76 and the gear 84 on the stub shaft 85.

A sleeve member 90 is mounted in the opposite end passage 74 of the housing 70 for rotatable and limited longitudinal movements therein. An externally threaded drill spindle 91 extends through the sleeve member 90 and is disposed in threaded engagement with an internal thread formed in the bore of the sleeve member 90. A feed gear 92 is freely rotatable about the sleeve member 90 and is meshed in driving engagement with the gear 87. A rapid traverse or drive gear 94 is spline connected to the drill spindle 91 beneath the sleeve member 90 and is meshed in driving engagement with the gear 84. The feed gear 92 is provided with a different number of teeth than the drive gear 94 whereby the gear ratio between the gear 84 and the drive gear 94 is slightly higher than the gear ratio between the gear 87 and the feed gear 92 whereby during simultaneous rotation of the gears 84 and 87, upon rotation of the drive shaft 76, the drive gear 94 will be rotated at a slightly greater speed than the feed gear 92.

Clutch means in the form of a pair of diametrically opposite radially extending lugs 96 formed on the lower end of the sleeve member 90 are provided for either preventing rotation of the sleeve member 90 during rotation of the feed gear 92 or for operably connecting the sleeve member 90 to the feed gear 92 for rotation therewith. The sleeve member 90 is normally resiliently urged downwardly by a coil spring 97 which is seated between a cap 98 secured in the upper end of the passage 74 and a spring retainer 99 which is mounted on the upper end of the sleeve member 90 whereby to position the lugs 96 in alignment for edgewise engagement with a pair of diametrically opposite stationary jaw members 100 formed on a rigid portion 101 of the housing 70, as illustrated in FIG. 14. With the lugs 96 so engaged, rotation of the sleeve member 90 which is threadedly engaged with the drill spindle 91 is prevented during rotation of the drill spindle 91 by the drive gear 94 whereby to impart a rapid transverse longitudinal movement to the drill spindle 91.

Upon a drill bit mounted in the drill spindle 91 engaging the work to be drilled, the pressure of the work against the point of the drill bit is sufficient to overcome the force of the spring 97 whereby to shift the sleeve member 90 upwardly until the lugs 96 are aligned for edgewise driving engagement by a pair of diametrically opposite jaw members 103 formed on the underside of the feed gear 92 whereby to drivingly connect the feed gear 92 to the sleeve member 90. With the lugs 96 so engaged, during rotation of the drive shaft 76, the sleeve member 90 which is threadedly engaged with the drill spindle 91 will be rotated by the feed gear 92 at a slightly slower speed than the speed that the drill spindle 91 is rotated by the drive gear 94, thereby imparting a relatively slow longitudinal feed movement to the drill spindle 91. Thus, the clutch means is shifted automatically to an engaged position as a result of pressure being applied by the work to the end of a drill bit mounted in the drill spindle 91 whereby to automatically change the longitudinal movement of the drill spindle 91 from its rapid traverse movement to its relatively slower feed movement during the actual drilling operation.

A still further embodiment of the invention is shown in FIGS. 15–18. Inasmuch as this embodiment is substantially identical to the embodiment of FIGS. 1–13 except for details of the clutch means, for purposes of convenience, elements of the embodiment of FIGS. 15–18 which correspond identically to elements of the embodiment of FIGS. 1–3 are identified by the same reference numbers. As illustrated, a modified feed gear 27a is meshed in driving engagement with the driven gear 18 and is freely rotatable about the drill spindle 24, as is the feed gear 27 of FIG. 1. However, the jaw members 42 on the underside of the gear 27 in FIG. 1 have been replaced in this embodiment by a somewhat different type clutch arrangement which provides highly effective results, particularly in certain drilling operations, for example, in drilling blind holes.

The bore of the feed gear 27a is provided with an internal or female involute spline formation 41a and the outer surface of the sleeve member 21a is provided, immediately above the radially extending lugs 33 thereon, with a mating external or male involute spline formation 43a. Preferably, the upper end portion of the spline formation 43a and the lower end portion of the spline formation 41a are chamfered to better facilitate engagement therebetween upon upward movement of the sleeve member 21a relative to the feed gear 27a. The modified stationary clutch jaws 39a, in the embodiment of FIGS. 15–18, are each provided with upper surfaces 45a which are inclined downwardly at a slight angle $c$ from a radial crest line through the center thereof. The angles $c$ may be in the order of 10°.

At the start of a drilling operation, the sleeve member 21a is normally resiliently urged downwardly into a first position (FIGS. 15, 17 and 18) wherein the lugs 33 are positioned for edgewise engagement with the side edges of the pair of diametrically opposite stationary jaw members 39a whereby the sleeve member 21a is held stationary during rotation of the drill spindle 24 by the drive gear 31 so that a rapid traverse longitudinal movement is imparted to the drill spindle 24. The feed gear 27a which is simultaneously driven by the gear 18 merely rotates freely about the sleeve member 21a. As soon as a drill bit in the drill spindle 24 engages the work to be drilled, during rapid traverse movement thereof, the pressure exerted by the work against the drill bit overcomes the downward resilient force acting on the sleeve member 21a and shifts the sleeve member 21a upwardly into its second position (FIG. 16) wherein the spline formation 43a thereon is engaged with the spline formation 41a on the inner bore of the feed gear 27a, thus drivingly connecting the sleeve member 21a to the feed gear 27a. Due to the differential gear ratios, as previously described in connection with the embodiment of FIGS. 1–13, the sleeve member 21a which is threadedly engaged with the drill spindle 24 will be rotated by the feed gear 27a at a slightly different speed than the speed at which the drill spindle 24 is rotated by the drive gear 31 whereby to impart a low rate of longitudinal feed movement to the drill spindle 24. It is noted that when the sleeve member 21a is moved upwardly, as a result of the drill point engaging the work to be drilled, the spline formations 41a and 43a are not drivingly engaged until after the vertical side edges of the stationary jaws 39a are cleared by the lugs 33 but are drivingly engaged before the lower surfaces of the lugs 33 clear the crests of the inclined upper surfaces 45a of the stationary jaws 39a.

Assuming a blind hole is being drilled, for example, when the operator reverses the drill drive before the drill bit has broken through, the sleeve member 21a is moved downwardly until the lugs 33 thereon engage the side edges of the stationary jaws 39a whereby a rapid traverse movement in reverse is automatically imparted to the drill spindle 24. The lugs 33 on the sleeve member 21a are not engageable with the side edges of the stationary jaws 39a until the sleeve member 21a has moved downwardly a distance such that the spline formation 43a thereon is disengaged from the spline formation 41a on the feed gear 27a. Thus if the lugs 33 first engage the inclined upper surfaces 45a of the stationary jaws 39a as the rotatably driven sleeve member 21a moves downwardly, the sleeve member 21a is merely cammed upwardly momentarily with the lugs 33 most probably engaging the side edges of the stationary jaws 39a during the next one or two revolutions of the sleeve member 21a whereby to automatically impart the reverse rapid traverse movement to the drill spindle 24.

Additional types of clutch structures may be provided within the scope of the invention such as, for example, clutch means whereby the sleeve member is shifted between its rapid traverse and positive feed positions with a snap-like action by means of a known-type toggle arrangement.

Many hole forming operations require that a hole be first drilled after which threads are formed therein. Normally, such an operation requires three separate steps, a drill operation, a tool-changing step, and then a tapping or thread-cutting operation. A novel combination unitary drill-tap tool 105 illustrated in FIG. 19 has been developed for use with any of the drill embodiments disclosed herein whereby to permit a hole to be drilled and tapped automatically in a single operation without the necessity of stopping the drill and changing tools. The elongated unitary drill-tap tool 105 includes a shank formation 106 on one end thereof, which shank formation may be of any one of the known types, for mounting the tool 105 in a drill spindle in a manner well known in the art. The opposite end of the tool 105 is provided with a known type drill formation 107 and a thread-cutting formation or tap 108 is provided intermediate the drill formation 107 and the shank formation 106 with the lead or pitch of the tap 108 being equal to the lead or pitch of the drill spindle thread of the drilling apparatus with which the tool 105 is to be used.

When the drill-tap tool 105 is used with any one of the disclosed drill embodiments, the rotating tool 105 will be advanced toward the work with a rapid traverse movement until the drill tip engages the work at which time a relatively slow feed movement will be automatically imparted to the tool 105 in the manner previously described herein. After the drill tip has broken through the far surface of the work and the drilling operation has been completed, the thread-cutting formation or tap 108 will enter the drilled hole and will start to cut a thread therein. This thread-cutting operation tends to pull the tool 105 and the drill spindle to which it is attached downwardly whereby to permit the clutch means of the drilling apparatus to be shifted into its disengaged position whereby to automatically impart a tap feed rate of movement to the drill spindle and thus permit completion of the thread-cutting operation at a desired rate. When the drive input is reversed to withdraw the tool 105 from the work after completion of both the drilling and thread-cutting operations, the drill spindle and the attached tool 105 will be withdrawn from the work with a rapid return movement inasmuch as no point pressure is then exerted on the drill tip. It is to be understood that the disclosed drilling apparatus can operate properly as a lead screw tapper only when the lead of the thread on the spindle is equal to the lead of the tap.

The hole drilling apparatus disclosed herein utilizes clutch devices which are shiftably responsive to an upward axial force on the drill spindle whereby to automatically change a rapid traverse movement of the drill spindle to a positive feed rate movement, which feed rate movement is not a function of the pressure applied to the drill.

It will be understood that certain changes may be made in the construction or arrangement of the hole forming apparatus disclosed herein without departing from the spirit and scope of the invention as defined in the appended claims.

I claim:

1. A self-feeding drill comprising, a housing, a drill spindle mounted in said housing for rotational and longitudinal movements, a sleeve member disposed about a portion of said spindle in threaded engagement therewith, a feed gear freely rotatable about said sleeve member, a drive gear disposed about another portion of said spindle and drivingly connected thereto in a manner permitting longitudinal movement of the spindle relative thereto, means for simultaneously rotating said feed and drive gears in a differential manner whereby said drive and feed gears are rotated at slightly different speeds, clutch means carried by said sleeve member, said sleeve member being longitudinally movable between a first position wherein said clutch means is in engagement with said feed gear to drivingly connect said sleeve member to said feed gear during rotation of said spindle by said drive gear whereby a relatively slow, longitudinal feed movement is imparted to said drill spindle and a second position wherein said clutch means is in engagement with a stationary portion of said housing to prevent rotation of said sleeve member during rotation of said spindle by said drive gear whereby a rapid traverse longitudinal movement is imparted to said drill spindle, and resilient means normally urging said sleeve member into said second position to engage said clutch means with said stationary portion of said housing, said sleeve member being shiftable into said first position in response to an inward axial force on the drill spindle to engage said clutch means with said feed gear.

2. A self-feeding drill as recited in claim 1 wherein said clutch means comprises a pair of radially extending lug members formed on said sleeve member, which lug members are engageable by a pair of jaw members on said feed gear in said first position of said sleeve member and with a pair of stationary jaw members on said housing in said second position of said sleeve member.

3. A self-feeding drill comprising, a housing, a drill spindle mounted in said housing for rotational and longitudinal movements, a sleeve member disposed about a portion of said spindle in threaded engagement therewith, a feed gear freely rotatable about said sleeve member, a drive gear disposed about another portion of said spindle and drivingly connected thereto in a manner permitting longitudinal movement of the spindle relative thereto, means for simultaneously rotating said feed and drive gears in a manner such that said drive and feed gears are rotated at slightly different speeds, radially extending lug members formed on one end of said sleeve member, said sleeve member being longitudinally movable between a first position wherein said lug members are engaged by jaw members formed on one end of said feed gear whereby said sleeve member is drivingly connected to said feed gear during rotation of said spindle by said drive gear whereby to impart a positive relatively slow longitudinal feed movement to said drill spindle and a second position wherein said lug members are engaged with stationary jaw members formed on said housing whereby to prevent rotation of said sleeve member during rotation of said spindle by said drive gear whereby to impart a rapid traverse movement to said drill spindle, and spring means normally urging said sleeve member into said second position whereby said spindle is moved toward the work to be drilled with said rapid traverse movement until the tip of a drill bit mounted in the spindle engages the work whereby the pressure of the work against the drill tip overcomes the action of said spring means and shitfs said sleeve member into said second position whereby to automatically impart said positive feed movement to said drill spindle.

4. A self-feeding drill comprising, a housing having a pair of generally parallel passages formed therein, which passages communicate with each other for a portion of their length, a drive shaft rotatably mounted in one of said passages, a pair of gears mounted on said drive shaft with one gear having one or more teeth than the other gear, a sleeve member mounted in the other passage for rotatable and limited axial movements therein and having an internal thread formed in the bore thereof, a drill spindle extending through said sleeve member and having an externally threaded portion for engagement with the threaded bore of said sleeve member, a feed gear rotatable about said sleeve member and meshed in driving engagement with one of said gears on said drive shaft, a rapid traverse gear having a spline connection with said drill spindle and meshed in driving engagement with the other one of said gears on said drive shaft, said feed gear having a different number of teeth than said rapid traverse gear whereby during rotation of said drive shaft said rapid traverse and feed gears are rotated at slightly different speeds, a pair of radially extending lugs formed on one end of said sleeve member, said sleeve member being movable axially between a first position in which said lugs are engaged with stationary jaw members formed on a rigid portion of the housing to positively prevent rotation of said threaded sleeve member when said feed and rapid traverse gears are rotated by said drive shaft whereby said drill spindle which is rotatably driven by said rapid traverse gear is provided with a rapid traverse axial movement and a second position in which said lugs are engaged by jaw members formed on one end of said feed gear to operably connect said sleeve member to said feed gear whereby during rotation of said drive shaft said threaded sleeve member is rotated at a slightly different speed than said rapid traverse gear thereby providing said drill spindle with a positive axial feed movement at a speed substantially less than the speed of said rapid traverse movement, and spring means resiliently urging said sleeve member into said first rapid traverse position until such time that a bit mounted in said drill spindle engages the work to be drilled whereby the pressure of the work against the drill bit serves to overcome the force of said spring means to shift said sleeve member into said second positive feed position.

5. A self-feeding drill wherein the drill bit is spaced from the drive therefor whereby to facilitate drilling at remote, hard-to-reach locations, said drill comprising, a generally elongated housing having a plurality of generally parallel passages formed therein in side-by-side relationship with adjacent passages communicating in part with each other, a drive shaft rotatably mounted in one of the end passages, a drive gear mounted on said drive shaft, a sleeve member mounted in the other end passage for rotatable and limited axial movements therein and having an internal thread formed in the bore thereof, which sleeve member has first clutch means mounted thereon, a drill spindle extending through said sleeve member and having an externally threaded portion for engagement with the threaded bore of said sleeve member, disengageable means normally preventing rotation of said sleeve, a feed gear rotatable about said sleeve member, which feed gear include second clutch means, a rapid traverse gear having a spline connection with said drill spindle, a pair of gears mounted on a shaft rotatably mounted in the passage next adjacent to the end passage in which said sleeve member is mounted with one of said gears having a different number of teeth than the other gear, said pair of gears being meshed in driving engagement with said rapid traverse and feed gears whereby to drive them differentially, a gear train operably connected between said drive gear and one of said pair of gears including a gear rotatably mounted in each of the other passages and disposed in meshed driving engagement with the gears in the passages on either side thereof, said feed gear having a different number of teeth than said rapid traverse gear whereby during rotation of said drive shaft said rapid traverse and feed gears are rotated at slightly different speeds, said disengageable means being adapted to be disengaged and said first and second clutch means being adapted to be brought into clutched engagement with each other in response to inward axial movement of the drill spindle for drivingly connecting said feed gear to said sleeve member whereby when said first and second clutch means are engaged said threaded sleeve member is rotated by said feed gear at a slightly different speed than said spindle is rotated by said rapid traverse gear, thereby imparting a relatively slow axial feed movement to said spindle, said first and second clutch means being normally disengaged in which condition said sleeve member is positively held against rotation during rotation of said spindle by said rapid traverse gear whereby a rapid traverse axial movement is imparted to said drill spindle.

6. A self-feeding drill wherein the drill bit is spaced from the drive therefore whereby to facilitate drilling at remote, hard-to-reach locations, said drill comprising, a generally elongated housing having a plurality of generally parallel passages formed therein in side-by-side relationship with adjacent passages communicating in part with each other, a drive shaft rotatably mounted in one of the end passages, a drive gear mounted on said drive shaft, a sleeve member mounted in the other end passage for rotatable and limited axial movements therein and having an internal thread formed in the bore thereof, a drill spindle extending through said sleeve member and having an externally threaded portion for engagement with the threaded bore of said sleeve member, a feed gear rotatable about said sleeve member, a rapid traverse gear having a spline connection with said drill spindle, a pair of gears mounted on a shaft rotatably mounted in the passage next adjacent to the end passage in which said sleeve member is mounted with one of said gears having one or more teeth than the other gear and being meshed in driving engagement with said rapid traverse gear and with said other gear being meshed in driving engagement with said feed gear, a gear train operably connected between said drive gear and one of said pair of gears including a gear rotatably mounted in each of the other passages and disposed in meshed driving engagement with the gears in the passages on either side thereof, said feed gear having one or more teeth than said rapid traverse gear whereby during rotation of said drive shaft said rapid traverse gear is rotated at a slightly greater speed than said feed gear, a pair of radially extending lugs formed on one end of said sleeve member, said sleeve member being movable axially between a first position in which said lugs are engaged with stationary jaw members formed on a rigid portion of the housing to prevent rotation of said threaded sleeve member when said feed and rapid traverse gears are rotated by said drive shaft through said gear train whereby said drill spindle which is rotatably driven by said rapid traverse gear is provided with a rapid traverse axial movement and a second position in which said lugs are engaged by jaw members formed on one end of said feed gear to operably connect said sleeve member to said feed gear whereby during rotation of said drive shaft said threaded sleeve member is rotated at a slightly slower speed than said rapid traverse gear thereby providing said drill spindle with an axial positive feed movement at a speed substantially less than the speed of said rapid traverse movement, and spring means resiliently urging said sleeve member into said first rapid traverse position until such time that a bit mounted in said drill spindle engages the work to be drilled whereby the pressure of the work against the drill bit serves to shift said sleeve member into said second positive feed position.

7. A threaded hole forming apparatus comprising, a drill spindle, a combination drill-tap tool mounted in the leading end of said drill spindle and characterized by a drill formation on its leading end and a thread-cutting tap spaced from said drill formation, a sleeve member disposed about a portion of said spindle in threaded engagement therewith, which sleeve member has first clutch means mounted thereon, the lead of said sleeve member-drill spindle thread being equal to the lead of said thread-cutting tap, disengageable means normally preventing rotation of said sleeve, a feed gear freely rotatable about said sleeve member, which feed gear includes second clutch means, a drive gear disposed about another portion of said spindle and drivingly connected thereto, means for simultaneously and differentially rotating said feed and drive gears in a manner such that they are rotated at slightly different speeds, said disengageable means being adapted to be disengaged and said first and second clutch means being adapted to be brought into clutched engagement with each other in response to pressure applied against the point of said drill-tap tool by the work to be drilled for drivingly connecting said feed gear to said sleeve member whereby to impart a relatively slow longitudinal feed movement to said drill spindle during the drilling operation, said first and second clutch means being resiliently disengaged when no pressure is applied against the point of said drill-tap tool in which condition rotation of said sleeve member is restrained during rotation of said drill spindle whereby to impart a rapid traverse movement to said drill spindle for approaching the work and for a tap feed rate of movement to said drill spindle during the thread-cutting operation, said tap feed rate being equal to the lead of said thread-cutting tap.

8. A self-feeding drill comprising, a housing, a drill spindle mounted in said housing for rotational and longitudinal movements, a sleeve member disposed about a portion of said spindle in threaded engagement therewith, which sleeve member has first clutch means mounted thereon, a feed gear freely rotatable about said sleeve member, which feed gear includes second clutch means, a drive gear disposed about another portion of said spindle and drivingly connected thereto in a manner permitting longitudinal movement of the spindle relative thereto, means for simultaneously rotating said feed and drive gears in a manner such that said drive and feed gears are rotated at slightly different speeds, means preventing rotation of said sleeve member during rotation of said spindle by said drive gear when said first and second clutch means are unclutched whereby a rapid traverse movement is imparted to said drill spindle, said first and second clutch means being adapted to be brought into clutched engagement with each other in response to point pressure applied against a drill bit mounted in said drill spindle by the work to be drilled for automatically drivingly connecting said sleeve member to said feed gear whereby a positive low rate of longitudinal feed movement is imparted to said drill spindle.

9. A self-feeding drill comprising, a housing, a drill spindle mounted in said housing for rotational and longitudinal movements, a sleeve member disposed about a portion of said spindle in threaded engagement therewith, a feed gear rotatable about said sleeve member and being characterized by an internal spline formation in the bore thereof, a drive gear disposed about another portion of said spindle and drivingly connected thereto in a manner permitting longitudinal movement of the spindle relative thereto, means for simultaneously rotating said feed and drive gears in a manner such that said drive and feed gears are rotated at slightly different speeds, a mating external spline formation formed on one end of said sleeve member, said sleeve member being lonigtudinally movable between a first position wherein said mating spline formations are engaged one with the other whereby said sleeve member is drivingly connected to said feed gear during rotation of said spindle by said drive gear whereby to impart a positive low rate of longitudinal feed movement to said drill spindle and a second position wherein said spline formations are disengaged from each other, means operable when said sleeve member is in said second position for preventing rotation thereof during rotation of said spindle by said drive gear whereby to impart a rapid traverse movement to said drill spindle, and spring means normally urging said sleeve member into said second position whereby said spindle is moved toward the work to be drilled with said rapid traverse movement until the tip of a drill bit mounted in the spindle engages the work whereby the pressure of the work against the drill tip overcomes the action of said spring means and shifts said sleeve member into said second position whereby to automatically impart said positive feed movement to said drill spindle.

10. A self-feeding drill comprising, a housing, a drill spindle mounted in said housing for rotational and longitudinal movements, a sleeve member disposed about a portion of said spindle in threaded engagement therewith, a feed gear freely rotatable about said sleeve member, a drive gear disposed about another portion of said spindle and drivingly connected thereto in a manner permitting longitudinal movement of the spindle relative thereto, means for simultaneously rotating said feed and drive gears in a differential manner whereby said drive and feed gears are rotated at slightly different speeds, said sleeve member being longitudinally movable relative to said feed gear between two positions, mating spline formations formed on said sleeve member and in the bore of said feed gear, which spline formations are disengaged in one of said positions of said sleeve member and are engaged in the other position of said sleeve member whereby to drivingly connect said sleeve member to said feed gear and thereby impart a low rate of longitudinal feed movement to said drill spindle during rotation of said spindle by said drive gear, resilient means normally urging said sleeve member into said one position wherein said sleeve member is normally disconnected from said feed gear during rotation thereof, and means for positively preventing rotation of said sleeve member in said one position whereby a rapid traverse longitudinal movement is normally imparted to said drill spindle during rotation thereof by said drive gear until point pressure on said drill spindle overcomes said resilient means whereby said sleeve member is automatically shifted into said other position to automatically impart said low rate of longitudinal feed movement to said drill spindle.

11. A self-feeding drill comprising, a housing, a drill spindle mounted in said housing for rotational and longitudinal movements, a sleeve member disposed about a portion of said spindle in threaded engagement therewith, a feed gear freely rotatable about said sleeve member and being characterized by an internal spline formation in the bore thereof, a drive gear disposed about another portion of said spindle and drivingly connected thereto in a manner permitting longitudinal movement of the spindle relative thereto, means for simultaneously rotating said feed and drive gears in a manner such that drive and feed gears are rotated at slightly different speeds, radially extending lug members formed on one end of said sleeve member, a mating external spline formation formed on said sleeve member intermediate said lug members and said feed gear, said sleeve member being longitudinally movable between a first position wherein said mating spline formations are engaged one with the other whereby said sleeve member is drivingly connected to said feed gear during rotation of said spindle by said drive gear whereby to impart a positive low rate of longitudinal feed movement to said drill spindle and a second position wherein said spline formations are disengaged from each other and said lug members are engaged with stationary jaw members formed on said housing whereby to prevent rotation of said sleeve member during rotation of said spindle by said drive gear whereby to impart a rapid traverse movement to said drill spindle, and spring means normally urging said sleeve member into said second position whereby said spindle is moved toward the work to be drilled with said rapid traverse movement until the tip of a drill bit mounted in the spindle engages the work whereby the pressure of the work against the drill tip overcomes the action of said spring means and shifts said sleeve member into said second position whereby to automatically impart said positive feed movement to said drill spindle.

12. A self-feeding drill comprising, a drill spindle, a sleeve member disposed about a portion of said spindle in threaded engagement therewith, which sleeve member includes first clutch means, a feed gear mounted adjacent said sleeve member, which feed gear includes second clutch means, a rapid traverse gear disposed about another portion of said spindle and drivingly connected thereto, means for simultaneously rotating said feed and rapid traverse gears in a manner such that said rapid traverse gear is rotated at a slightly different speed than said feed gear, said first and second clutch means being adapted to be brought into clutched engagement with each other in response to an axial force on said drill spindle for drivingly connecting said feed gear to said sleeve member whereby to impart a relatively slow longitudinal feed movement to said drill spindle, means for restraining rotation of said sleeve when said first and second clutch means are unclutched whereby said drill spindle has a longitudinal rapid traverse movement imparted thereto.

13. A self-feeding drill comprising, a drill spindle, a sleeve member disposed about a portion of said spindle in threaded engagement therewith, which sleeve member includes first clutch means, a feed gear mounted adjacent said sleeve member, which feed gear includes second clutch means, a rapid traverse gear disposed about another portion of said spindle and drivingly connected thereto, means for simultaneously rotating said feed and rapid traverse gears in a manner such that said rapid traverse gear is rotated at a slightly different speed than said feed gear, said first and second clutch means being adapted to be brought into clutched engagement with each other in response to an axial force on said drill spindle for drivingly connecting said feed gear to said sleeve member whereby to impart a relatively slow longitudinal feed movement to said drill spindle, means for restraining rotation of said sleeve member when said first and second clutch means are unclutched whereby said drill spindle has a longitudinal rapid traverse movement imparted thereto, and spring means normally urging said first and second clutch means into their unclutched condition whereby the spindle moves toward the work to be drilled with a rapid traverse movement until the tip of a drill bit mounted to the spindle engages the work to be drilled whereby the pressure of the work against the drill tip overcomes the action of said spring means and engages said first and second clutch means whereby to impart automatically said feed movement to said drill spindle.

14. A self-feeding drill comprising, a housing having a pair of generally parallel passages formed therein, which passages communicate with each other for a portion of their length, a drive shaft rotatably mounted in one of said passages, a pair of gears mounted on said drive shaft with one gear having one or more teeth than the other gear, a sleeve member in the other passages for rotatable and limited axial movements therein and having an internal thread formed in the bore thereof, which sleeve member has first clutch means mounted thereon, a drill spindle extending through said sleeve member and having an externally threaded portion for engagement with the threaded bore of said sleeve member, a feed gear rotatable about said sleeve member and meshed in driving engagement with said other gear on said drive shaft having the lesser number of teeth, which feed gear includes second clutch means, a rapid traverse gear having a spline connection with said drill spindle and meshed in driving engagement with said one gear on said drive shaft having the greater number of teeth, said feed gear having one or more teeth than said rapid traverse gear whereby during rotation of said drive shaft said rapid traverse gear is rotated at a slightly greater speed than said feed gear, disengageable means normally preventing rotation of said sleeve and said first and second clutch means normally being unclutched whereby said spindle has a rapid traverse axial movement imparted thereto during rotation of said drive shaft, said first and second clutch means being brought into clutched engagement and said disengageable means being disengaged in response to axial movement of the drill spindle for drivingly connecting said feed gear to said sleeve member whereby said threaded sleeve member is rotated by said feed gear at a slightly slower speed than said spindle is rotated by said rapid traverse gear, thereby imparting a relatively slow axial feed movement to said spindle.

References Cited in the file of this patent
UNITED STATES PATENTS

| | | |
|---|---|---|
| 1,539,628 | Bayer | May 26, 1925 |
| 3,013,285 | Arengo | Dec. 19, 1961 |

FOREIGN PATENTS

| | | |
|---|---|---|
| 806,916 | France | Oct. 5, 1936 |